Dec. 13, 1949　　　L. P. MILLARD　　　2,491,196
ENSILAGE HARVESTER

Filed Jan. 31, 1944　　　　　　　　　　　4 Sheets-Sheet 1

Inventor:
Lee P. Millard,
By Paul O. Pippel
Attorney.

Dec. 13, 1949 L. P. MILLARD 2,491,196
ENSILAGE HARVESTER
Filed Jan. 31, 1944 4 Sheets-Sheet 2
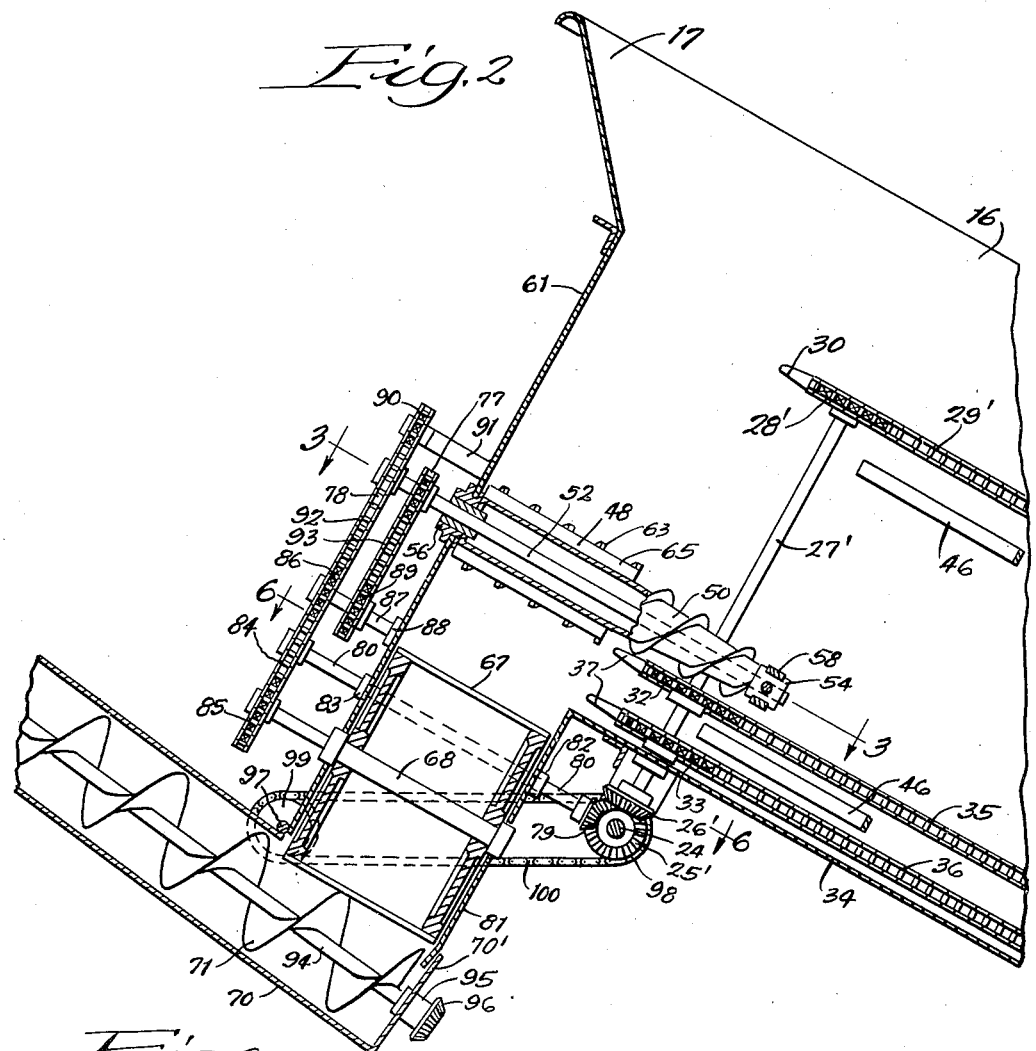
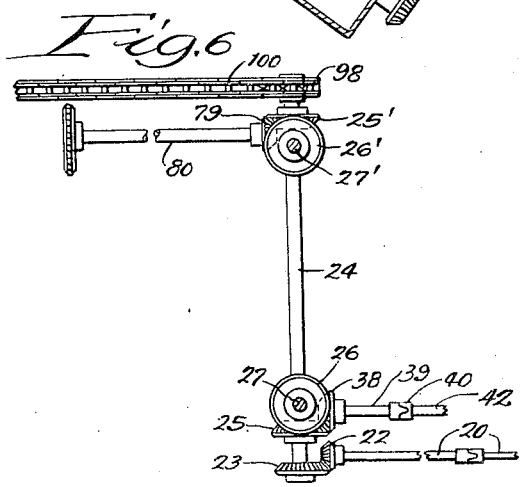
Inventor:
Lee P. Millard,
By Paul O. Pippel
Attorney.

Dec. 13, 1949  L. P. MILLARD  2,491,196
ENSILAGE HARVESTER
Filed Jan. 31, 1944  4 Sheets-Sheet 3
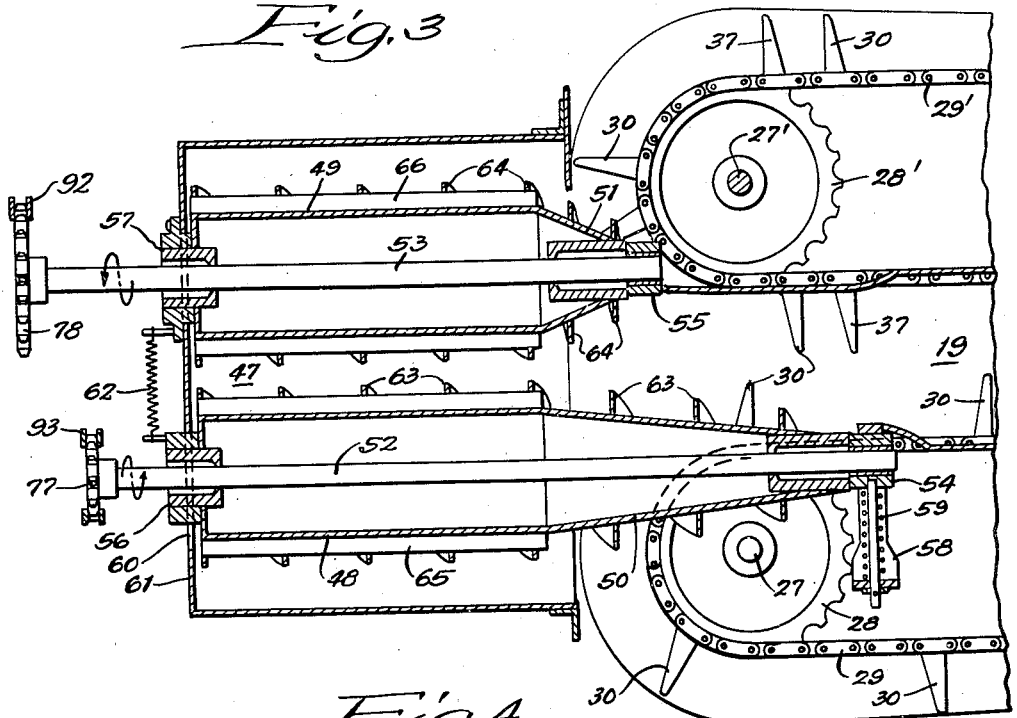
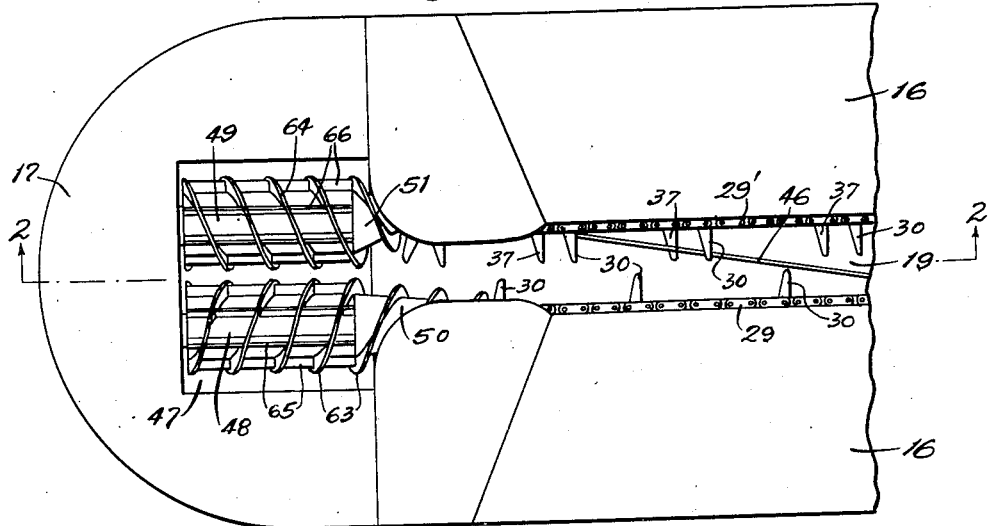
Inventor:
Lee P. Millard,
By Paul O. Pippel
Attorney.

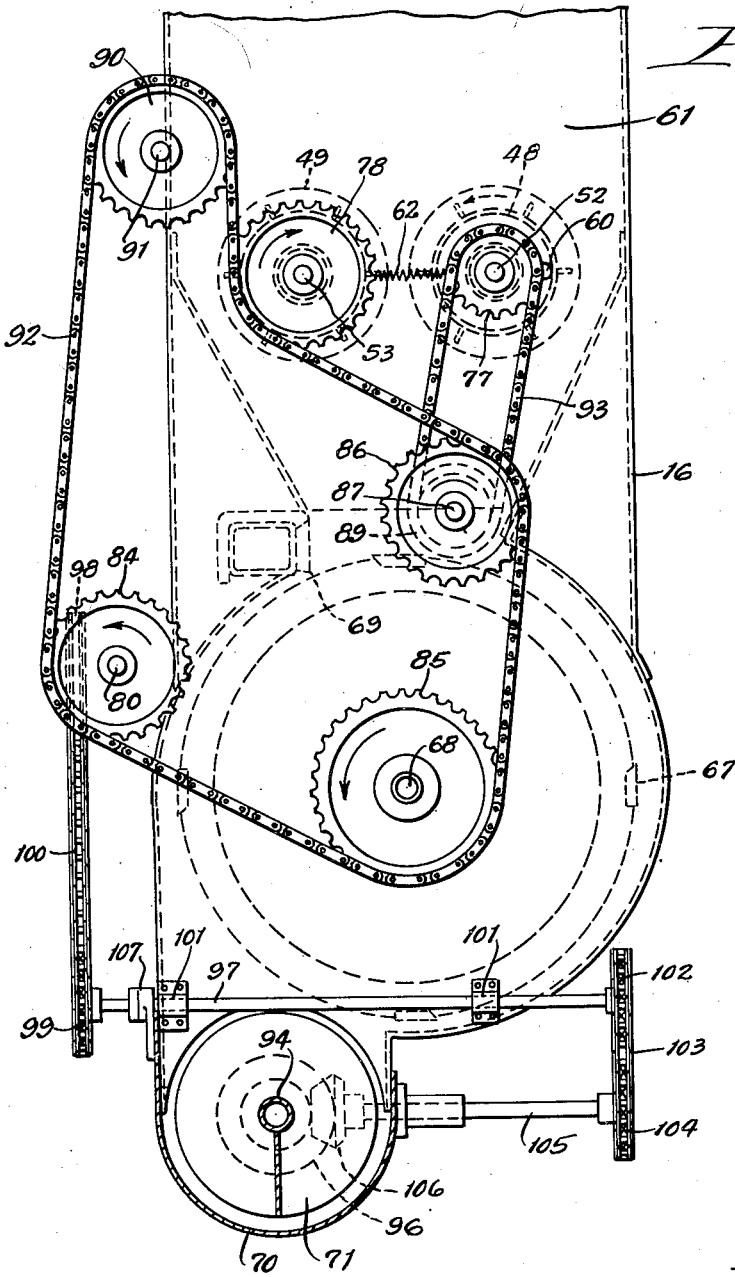

Patented Dec. 13, 1949

2,491,196

UNITED STATES PATENT OFFICE 2,491,196

ENSILAGE HARVESTER

Lee P. Millard, Chicago, Ill., assignor to International Harvester Company, a corporation of New Jersey Application January 31, 1944, Serial No. 520,394

2 Claims. (Cl. 56—61)

1

This invention relates to a new and improved harvester such as, for example, an ensilage harvester, and has for one of its principal objects the provision of means for feeding cut corn stalks to a cutting mechanism by a continuous and progressive action.

An important object of this invention is to provide an ensilage harvester wherein the corn stalks are severed at their bottoms and then conveyed rearwardly to a stalk-chopping mechanism and thence to an elevator, all substantially in a straight line.

Another important object of the invention is to provide an ensilage harvester which is adapted to sever the standing corn stalks and carry them in a substantially upright position to a stalk-chopping device, whereupon the upright stalks are simultaneously fed downwardly and rearwardly into the stalk cutter.

A still further object of the present invention is to provide a harvester equipped with a pair of spirally flighted, longitudinally fluted feed rolls adapted to progressively move substantially upright corn stalks in a downward and rearward direction.

Another and still further important object is to provide an ensilage harvester with a pair of feed rolls, which rolls are parallel to the line of ensilage harvester travel and which are adapted to feed severed corn stalks downwardly and rearwardly into a relatively wide cylindrical chopping device parallel with the pair of feed rolls.

A further important object is to provide a single straight continuous wagon elevator beginning directly beneath the stalk-chopping mechanism.

Other and further important objects of this invention will become apparent from the following detailed description and accompanying sheets of drawings, in which:

Figure 2 is an enlarged vertical sectional view through the throat portion of the ensilage harvester on the line 2—2 of Figure 4;

Figure 3 is an enlarged sectional view taken on the line 3—3 of Figure 2;

Figure 4 is an enlarged top plan view of an upper portion of the ensilage harvester as shown in Figure 1;

Figure 5 is an enlarged rear view of the ensilage harvester; and

Figure 6 is a sectional view taken on the line 6—6 of Figure 2.

2

Figure 1:
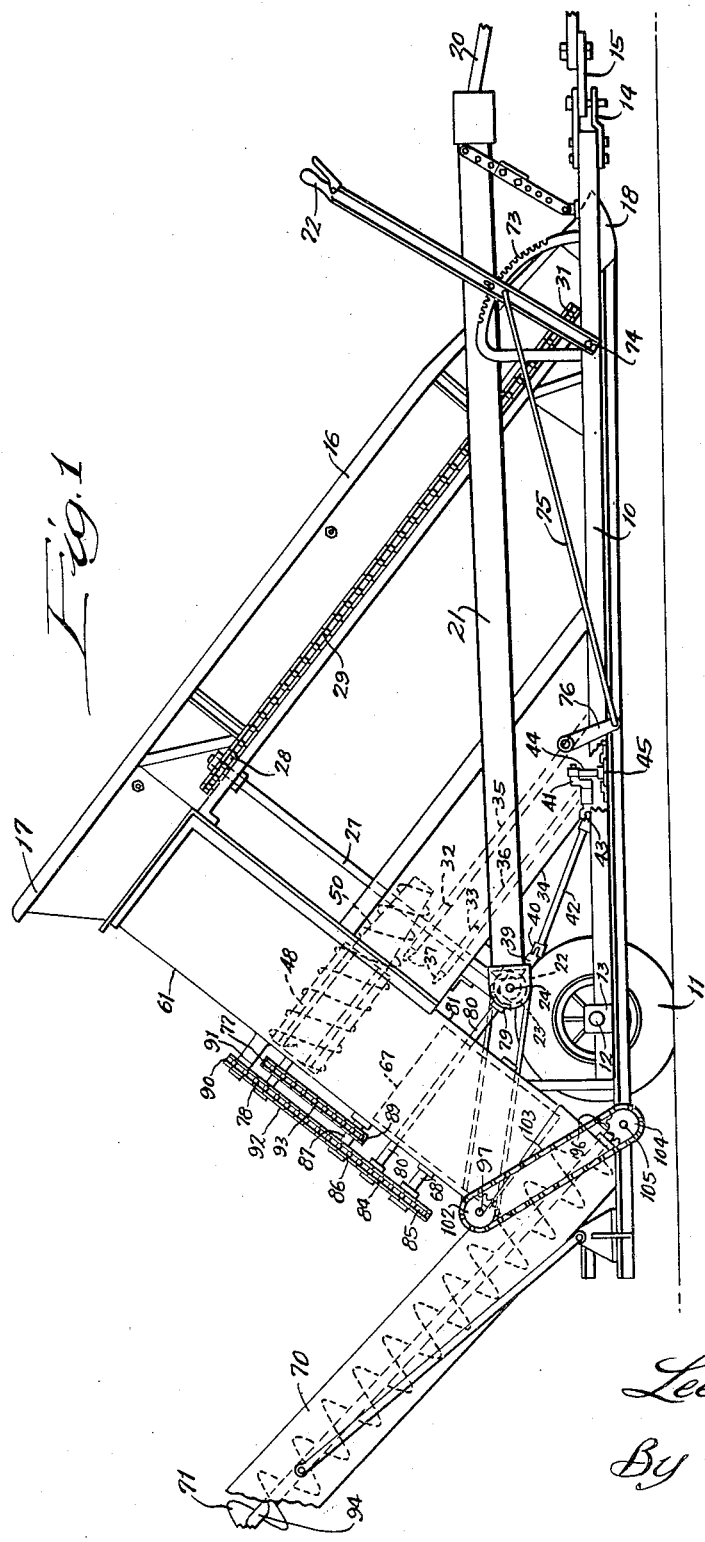
Figure 1 is a side elevation of the ensilage harvester incorporating the novel features of this invention.

As shown in the drawings, the reference numeral 10 indicates generally a supporting frame for a harvester such as an ensilage harvester. The rear end of the frame 10 is supported by ground-engaging wheels 11 which are mounted on an axle 12 journaled in bearings 13 mounted in alinement on spaced apart portions of the frame 10. The forward end of the frame 10 is equipped with a hitching device in the form of a clevis 14 which is adapted to be attached to the draw-bar 15 of a tractor or other draft vehicle.

The ensilage harvester proper consists of a U-shaped body 16 having its bight portion at the rear end thereof at 17. This is best shown in Figure 4. The forward ends of the U-shaped body terminate in gathering points 18 shown only in Figure 1. These points 18 are adapted to be raised and lowered about the wheel axle 12 by means of a hand lever 72, which is operable about a notched quadrant 73 around a pivot point 74 on the frame 10. A connecting link 75 joins the lever arm 72 and an arm 76 which is fixed to the body 16 of the ensilage harvester. It is the purpose of this ensilage harvester to travel down a row of corn so that the two gathering points 18 at the forward end of the body 16 lie on each side of the standing corn stalks and thereby maintain the stalks in a space 19 between body portions 16.

An ensilage harvester includes several conveying means as well as cutting and chopping means that require driving. The drive for these several items is procured from a power take-off from the tractor, as shown in the drawings at 20.

In the present device, the power take-off shaft 20 has its power transmitted through a longitudinally positioned tube member 21 and thereupon drives a bevel gear 22. The drive for the entire ensilage harvester mechanism is taken from this bevel gear 22. A complementary bevel gear 23 is directly driven by the gear 22 and causes rotation of a shaft 24. This shaft 24 has two other bevel gears 25 and 25' mounted thereon at opposite sides of the U-shaped body 16, as best shown in Figure 6. It is apparent, therefore, that the shaft 24 extends across and beneath the body 16. Complementary bevel gears 26 and 26' engage the gears 25 and 25', respectively, and are fixed to shafts 27 and 27'. These shafts 27 and 27', shown in Figures 1, 2, and 3, extend upwardly into the body portion 16, and each carries a sprocket 28 and 28' at its upper end thereof. Conveyer gathering chains 29 and 29' having finger-like lugs 30 surround each sprocket 28 and 28' and, as shown in Figure 1, extend downwardly to the points 18 and are wrapped around sprockets 31 journaled in each point 18. The shaft 27' has mounted thereon sprockets 32 and 33 positioned relatively close to the bottom of the shaft and closely above a bottom plate 34 of the harvester body 16. Each sprocket 32 and 33 carries a chain 35 and 36, respectively, which proceed forwardly and are mounted around suitably journaled sprockets (not shown). Similar to the chains 29 and 29', the chains 35 and 36 carry finger-like lugs 37. The shaft 27 does not have sprockets or chains corresponding to the sprockets 32 and 33 and chains 35 and 36.

A further bevel gear 38 meshes with the bevel gear 25 and receives rotation therefrom. The bevel gear 38 is attached to a short shaft 39 which terminates in a universal joint 40, the other side of which is adapted to drive a crank 41 by means of a shaft 42 and a second universal joint 43. The crank 41 drives a pitman 44 which causes reciprocation of a sickle bar 45. This sickle bar or primary cutter is adapted to cut the standing corn stalks relatively close to the ground so that the severed stalks may then be carried upwardly and rearwardly in the space 19 by means of the finger-like lugs 30 and 37. The stalks are maintained closely adjacent the chain 29' by means of a spring member 46 which is attached at its forward end to the harvester body 16 which carries the chain 29. The rearward end of the spring member 46 normally lies close to the chain 29' but is not attached thereto.

The throat portion 47 of the harvester body 16 contains forwardly and downwardly extending feed rolls 48 and 49. Each of these rolls 48 and 49 has forwardly tapering points 50 and 51, respectively. The point 50, as best shown in Figure 3, is considerably longer than the point 51 to compensate for the lack of gathering chains such as 35 and 36 which are beneath the chain 29'. It has been customary to employ a "kicker" or "packer" arm on the lower end of the shaft 27 in the space here occupied by the long point 50.

It will be evident from Figures 1 and 2 that the feed rolls 48 and 49 are in a plane closely adjacent the lower gathering chains 35 and 36 and form a substantially rearward continuation thereof. As best shown in Figure 3, the rolls 48 and 49 are equipped with central supporting shafts 52 and 53, respectively. These shafts 52 and 53 are journaled in bearings 54 and 55 at their forward ends and at 56 and 57 at their rearward ends. The bearing 54 is resiliently mounted within a bracket member 58 by means of a spring 59. It is evident, therefore, that the forward end of the roll 48 may yield laterally when the quantity of material between the rolls 48 and 49 so requires. The rearward bearing 56 for the roll 48 is also yieldable laterally within a slot 60 of an end wall 61. The bearings 55 and 57 are mounted fixedly in the body of the ensilage harvester. A spring 62 interconnects the bearing members 56 and 57, and inasmuch as the bearing 57 is in a fixed position, it is obvious that the bearing 56 yields resiliently away from the bearing 57 during the passage of a considerable number of stalks or foliage through the feed rolls 48 and 49.

Both of the feed rolls 48 and 49 are equipped with spiral flightings 63 and 64, respectively. The spiral flightings 63 and 64 extend the entire length of the rolls 48 and 49 including their points 50 and 51. This assures continuous rearward movement of the corn stalks cut by the sickle 45 until such time as the stalks reach the end wall 61. Longitudinal flutes or ribs extend along the main body portion of the rolls 48 and 49 at 65 and 66, respectively. The rolls 48 and 49 rotate inwardly toward each other so that the flutes 65 and 66 cooperate to impel the corn stalks passing therebetween downwardly. The rolls 48 and 49, therefore, impart to the corn stalks a continuously rearward motion over the entire length of the rolls and, in addition, impart to the stalks a downward motion.

Heretofore, ensilage harvesters have been made with chopping devices at the rear thereof in a position approximately similar to a rotary chopper 67, as best shown in Figures 1 and 2. However, the cutting mechanisms, as heretofore employed, were placed at right angles to the feeding devices and generally employed a stationary knife or cutting edge parallel to the rear wall. Regardless of how wide the rotary cutter was in these old machines, stalks would always be at one small area of the cutter and congestion would occur. It is, therefore, one of the principal purposes of this ensilage harvester to eliminate such congestion and to utilize the entire width of the rotary cutter. The rotary cutter 67 in the present device is mounted on a shaft 68 which is parallel to the feed rolls 48 and 49. As best shown in Figure 5, a stationary cutter 69 is fixedly positioned within the body 16 of the machine so that it lies parallel to the rolls 48 and 49 and directly beneath them.

It is quite obvious that corn stalks being simultaneously fed rearwardly and downwardly by the cooperating feed rolls 48 and 49 will enter the cutting mechanism including the rotary cutter 67 and the stationary blade 69 along the entire length thereof, so that as the stalk progresses rearwardly, it is cut off at its bottom in appropriate short pieces. Directly beneath the rotary cutter 67 is an elevator 70 which comprises an auger 71 which is adapted to receive the short cut pieces of corn stalks and elevate them to a trailing wagon or the like. It will be apparent that inasmuch as the elevator 70 is fitted directly to the bottom of the body portion 16 beneath and parallel with the cutter 67, the complete wagon elevator may be one continuous tube containing the auger conveyor 71. It will be noted that heretofore additional conveyers have necessarily been employed to feed material from the chopping mechanism to the elevator.

The central shafts 52 and 53 of the rolls 48 and 49, respectively, extend rearwardly beyond their bearings 56 and 57 and have mounted thereon sprockets 77 and 78, respectively. Sprocket 77 is arcuately movable about a stub shaft 87 thus permitting lateral yielding of the shaft 52 and its bearing 56 in the slot 60. As best shown in Figure 2, a bevel gear 79 is adapted to mesh with the bevel gear 25'. The bevel gear 79 is mounted on a shaft 80 which projects rearwardly through an intermediate wall 81 and thence through the rear wall 61 and is journaled within bearings 82 and 83. On the rear end of the shaft 80 is mounted a sprocket 84 which is best shown in Figures 2 and 5. The shaft 68 of the rotary cutter 67 projects rearwardly and supports a sprocket 85. A sprocket 86 is mounted on the stub shaft 87 which is journaled within a bearing 88. A second sprocket 89 is also mounted on the stub shaft 87 and lies in a plane with the sprocket 77 on the feed roll shaft 52. An idler sprocket 90 is journaled on a fixed shaft 91. A continuous chain 92 is wrapped about the sprockets 84, 85, 86, and 90 and engages the sprocket 78, thereby imparting rotation from the sprocket 84 driven from the power take-off shaft 20 of the tractor to each of these other sprockets. The feed rolls 48 and 49 rotate inwardly toward each other and hence are driven in opposite directions. This is accomplished by an auxiliary chain 93 extending from the sprocket 89 to the sprocket 77. It is apparent that the chains 92 and 93 cause rotation of the feed rolls 48 and 49 as well as the rotary cutter 67.

The auger 71 has a central shaft 94 which is journaled in a bearing 95 and has a bevel gear 96 at the end thereof. The elevator 70 is pivoted about a shaft 97, and thereby a change in height of the elevator is made possible. A sprocket 98 is keyed to the outer end of shaft 24 as shown in Figure 6. Another sprocket 99 is affixed to the shaft 97 which forms a hinge for the elevator 70. A chain 100 joins the sprockets 98 and 99. The shaft 97 is journaled in bearing brackets 101 which are fastened to the rear wall 61 of the ensilage harvester. Thus the forward end of the elevator housing 70 projects under the cutter 67 forwardly of pivot shaft 97. The front wall 70' of housing 70 has a wiping overlapped relation with the wall 81 as shown in Figure 2 to keep said front end closed when raising or lowering the elevator housing 70. Another sprocket 102 is keyed to the outer end of the shaft 97, and by means of a chain 103 drives the sprocket 104 on a shaft 105 upon which is mounted a bevel gear 106 adapted to mesh with the bevel gear 96 of the auger 71. The elevator 70 is shown hinged at 107 on the shaft 97.

It is believed that herein is provided a new and novel ensilage harvester capable of severing corn standing in a field and adapted to carry the cut stalks in an upright position rearwardly to a pair of feed rolls. These feed rolls perform a dual function in that they cause the corn stalks to move rearwardly and downwardly simultaneously into a rotary cutter placed parallel to the feed rolls. An elevator is positioned directly beneath the rotary cutter and substantially parallel thereto. The result is a continuous and progressive straight line movement of the corn stalk through the machine from the time it is severed from the plant to the time it reaches a trailing wagon in short cut lengths.

The intention is to limit the invention only within the scope of the appended claims.

What is claimed is:

1. In a harvester, stalk gathering points, a primary cutter at the forward end of said gathering points for severing standing stalks, gathering chains movably carried in said gathering points and extending upwardly and rearwardly from a position adjacent said primary cutter for moving said stalks upwardly and rearwardly in erect position, a feed throat located rearwardly of said gathering points to receive the stalks, stalk chopping means at the bottom of said throat, and in combination therewith cooperative feed rolls in said throat adapted to receive the stalks from said gathering chains, and having cylindrical body portions and tapered forward ends with spiral flighting extending the length of the rolls, and annularly spaced longitudinal flutes extending continuously throughout the length of the cylindrical body portions of the rolls.

2. In a harvester having a U-shaped body with the bight portion at the rear forming a throat, a primary cutter positioned across the forward ends of the U body and adapted to sever standing stalks, gathering chains arranged and constructed on one side of said U body and having finger lugs extending into the space between the forward ends of the U body, and in combination therewith a pair of cooperative feed rolls disposed longitudinally in the throat of said body, said rolls comprising cylindrical body portions and conically reduced forward ends, one of said rolls terminating closely adjacent the discharge ends of the gathering chains, and the other of said rolls having its conical forward end substantially overlapping said gathering chains.

LEE P. MILLARD.

REFERENCES CITED

The following references are of record in the file of this patent:

UNITED STATES PATENTS

| Number | Name | Date |
| --- | --- | --- |
| 309,462 | Hopper | Dec. 16, 1884 |
| 914,465 | Stone | Mar. 9, 1909 |
| 1,241,325 | Angus | Sept. 25, 1917 |
| 1,528,635 | Ronning et al. | Mar. 3, 1925 |
| 1,665,401 | Blecke | Apr. 10, 1928 |
| 1,688,206 | Rosholt | Oct. 16, 1928 |
| 1,722,717 | Trottman | July 30, 1929 |
| 2,229,628 | Anderson | Jan. 28, 1941 |
| 2,252,159 | Blank | Aug. 12, 1941 |
| 2,333,901 | Swenson | Nov. 9, 1943 |